(12) United States Patent
Tammana et al.

(10) Patent No.: US 7,774,771 B2
(45) Date of Patent: Aug. 10, 2010

(54) METHOD AND SYSTEM FOR MANAGING AND ORGANIZING SOFTWARE PACKAGE INSTALLATIONS

(75) Inventors: Rajesh Tammana, Schaumburg, IL (US); Allen Saxton, Schaumburg, IL (US)

(73) Assignee: InstallShield, Inc., Santa Clara, CA (US)

( * ) Notice: Subject to any disclaimer, the term of this patent is extended or adjusted under 35 U.S.C. 154(b) by 1260 days.

(21) Appl. No.: 11/235,970

(22) Filed: Sep. 26, 2005

(65) Prior Publication Data

US 2007/0074205 A1     Mar. 29, 2007

(51) Int. Cl.
*G06F 9/44*   (2006.01)
(52) U.S. Cl. .................................................... 717/170
(58) Field of Classification Search ......... 717/168–170, 717/174–175
See application file for complete search history.

(56) References Cited

U.S. PATENT DOCUMENTS

| | | | |
|---|---|---|---|
| 6,327,698 B1* | 12/2001 | Kolluru ..................... | 717/104 |
| 6,738,970 B1* | 5/2004 | Kruger et al. .............. | 717/175 |
| 7,448,033 B1* | 11/2008 | Kruger et al. .............. | 717/175 |
| 2003/0216927 A1* | 11/2003 | Sridhar et al. ................. | 705/1 |
| 2004/0019878 A1* | 1/2004 | Kotnur et al. ............... | 717/120 |
| 2004/0117767 A1* | 6/2004 | Tanno et al. ................ | 717/124 |
| 2004/0148184 A1 | 7/2004 | Sadiq | |
| 2005/0055686 A1* | 3/2005 | Buban et al. ................ | 717/170 |
| 2005/0289513 A1* | 12/2005 | Chen et al. .................. | 717/121 |
| 2006/0026589 A1* | 2/2006 | Schneider et al. ........... | 717/174 |

OTHER PUBLICATIONS

PCT/US06/36961, Mar. 24, 2008, PCT Search Report and Written Opinion.
Levine, Trudy: "Reusable Software Components." In ACM SIGAda Ada Letters archieve, vol. XVI, Issue 4 (Jul./Aug. 1996), pp. 20-44, 1996. [retrieved on Jul. 13, 2007][retrieved from the Internet: <URL: http://www.acm.org/sigada/ada_letters/sept2005/Reusable%20SW%20Components-%20Trudy%20Levine.pdf>.

* cited by examiner

*Primary Examiner*—Anna Deng
(74) *Attorney, Agent, or Firm*—Orrick, Herrington & Sutcliffe LLP

(57) ABSTRACT

A method and system for managing and organizing software package installations are disclosed. In one embodiment, the method comprises receiving a software package from a computer source. One or more properties of the received software package are identified. The identified one or more properties of the received software package are stored in a first storage module. And the received software package is stored in a second storage module.

15 Claims, 7 Drawing Sheets

METHOD AND SYSTEM FOR MANAGING AND ORGANIZING SOFTWARE PACKAGE INSTALLATIONS

FIELD OF THE INVENTION

The field of the invention relates generally to computer systems and more particularly relates to a method and system for managing and organizing software package installations.

BACKGROUND OF THE INVENTION

Generally, in an enterprise environment, an administrator employs a distribution system to deploy a software package to one or more computer machines. The software package usually includes inherent properties (e.g., developer of the software package, program name, version, language, build number, release date, etc.) that may be useful to an administrator in determining what programs should be installed on a computer machine or for otherwise managing and organizing all the various software packages in the enterprise. However, some of these properties may not be easily discovered from the software package before it is installed on a computer machine. In some instances, other properties (e.g., build number) are not independently determinable even after the software package is installed on a computer machine. This presents challenges for administrators to identify, examine, manage, and organize software packages and their associated properties.

In addition, it is difficult for administrators to distinguish between software packages that have minor property differences. For example, a particular software package may represent a distinct version of another software package even if these software packages are not significantly different from each other (e.g., their properties may be the same except their build numbers). Furthermore, a software package may include files that, unless protected, are vulnerable to accidental modification. Therefore, it is desirable to store software packages in a secure location to prevent unintended modifications to files associated with the software packages.

In the past, to manage and organize a software package and its associated properties, a public directory (e.g., in an hierarchical structure) is created to store the software package and represent its properties such as version and build numbers. Nevertheless, if a particular software package is removed from such a public directory to a secure location to prevent modifications to package files, property information associated with that software package is similarly removed from the public directory. Thus, it is difficult for administrators to provide a secure environment for software packages and to preserve property information associated with the software packages.

In addition, certain installation technologies (e.g., Windows Installer Transform ("MST") files) can materially change a software package and its associated properties (e.g., version and/or build numbers) during package installation. To properly manage and organize software package installations, an administrator may need to understand whether such installation technologies can be applied to a particular software package and how such installation technologies will affect the installation of the software package.

SUMMARY

A method and system for managing and organizing software package installations are disclosed. In one embodiment, the method comprises receiving a software package from a computer source. One or more properties of the received software package are identified. The identified one or more properties of the received software package are stored in a first storage module. And the received software package is stored in a second storage module.

The above and other preferred features, including various novel details of implementation and combination of elements, will now be more particularly described with reference to the accompanying drawings and pointed out in the claims. It will be understood that the particular methods and systems described herein are shown by way of illustration only and not as limitations. As will be understood by those skilled in the art, the principles and features described herein may be employed in various and numerous embodiments without departing from the scope of the invention.

BRIEF DESCRIPTION OF THE DRAWINGS

The accompanying drawings, which are included as part of the present specification, illustrate the presently preferred embodiment and together with the general description given above and the detailed description of the preferred embodiment given below serve to explain and teach the principles of the present invention.

DETAILED DESCRIPTION

Figure 1:
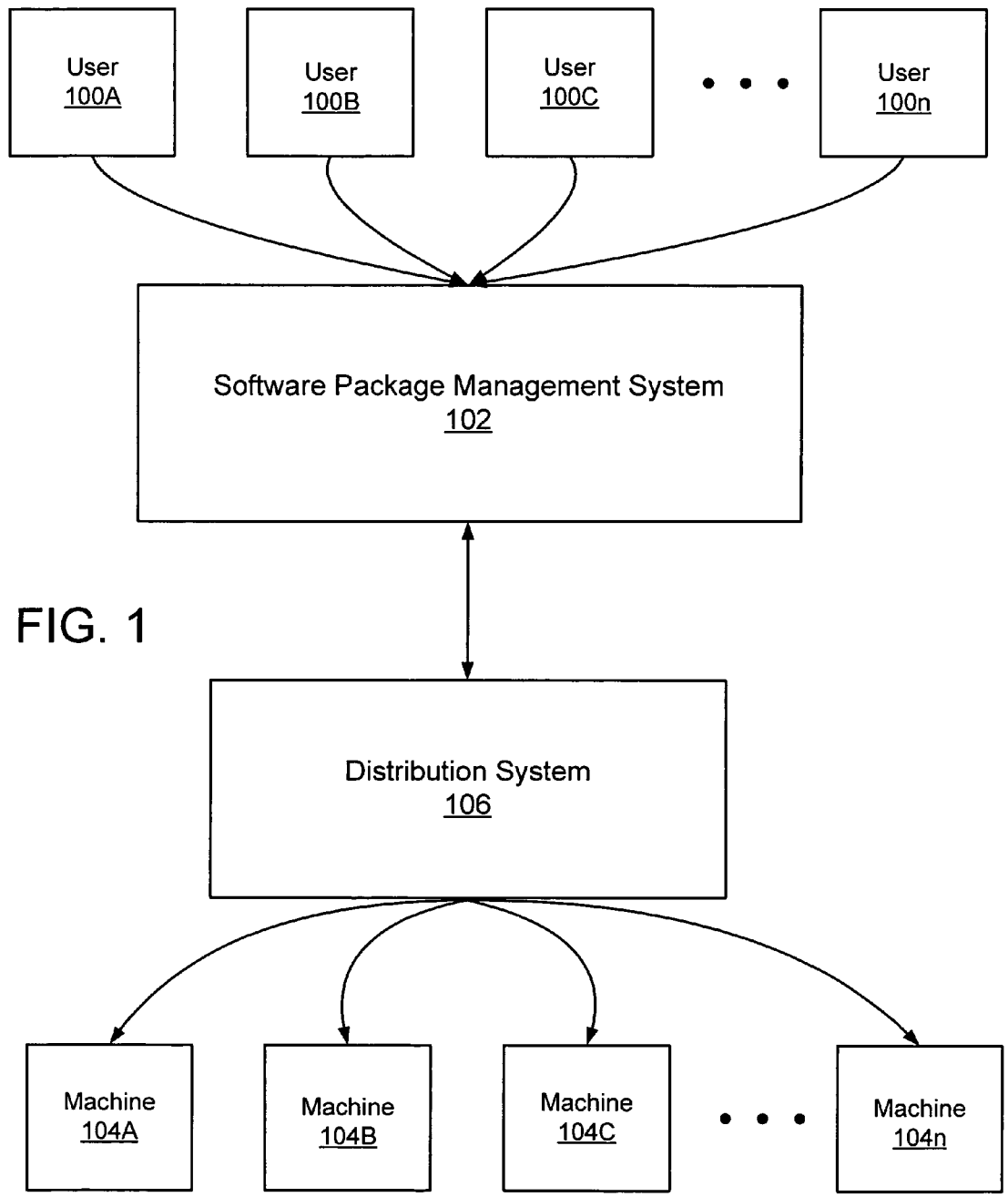
FIGS. 1-3 illustrate block diagrams of an exemplary software package management system, according to an embodiment.

A method and system for managing and organizing software package installations are disclosed. In one embodiment, the method comprises receiving a software package from a user. One or more properties of the received software package are identified. The identified one or more properties of the received software package are stored in a first storage module. And the received software package is stored in a second storage module.

In the following description, for purposes of explanation, specific nomenclature is set forth to provide a thorough understanding of the various inventive concepts disclosed herein. However, it will be apparent to one skilled in the art that these specific details are not required in order to practice the various inventive concepts disclosed herein.

Some portions of the detailed descriptions that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories ("ROMs"), random access memories ("RAMs"), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general-purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

As used herein, the following terms shall have the following meanings without regard to its upper or lower case usage.

"Computer source" means a location on a computer or network from which a software package may be received.

"Distribution system" refers to a system that deploys a software package to one or more target machines.

"Interface module" refers to any combination of software, firmware, and/or hardware that provides an interface between a user and a software package storage module and software package property storage module.

"Patch file" means a self-contained file that patches or updates an existing installed software package.

"Pre-deployment system" refers to a system that allows a user to test a software package on one or more target machines without installing the software package on the one or more target machines.

"Software package" refers to a package of software applications to be installed on a target machine.

"Software package management system" refers to a system that manages software packages that may be or have been distributed to one or more computer machines and includes, without limitation, an interface module, a software package storage module, and a software package property storage module.

"Software package property storage module" refers to any combination of software, firmware, and/or hardware that stores properties associated with software packages that may be or have been distributed to one or more computer machines.

"Software package storage module" refers to any combination of software, firmware, and/or hardware that stores software packages that may be or have been distributed to one or more computer machines.

"Transform file" means a file that can be applied independently during the installation of a software package to change a behavior of the installation.

Figure 2:
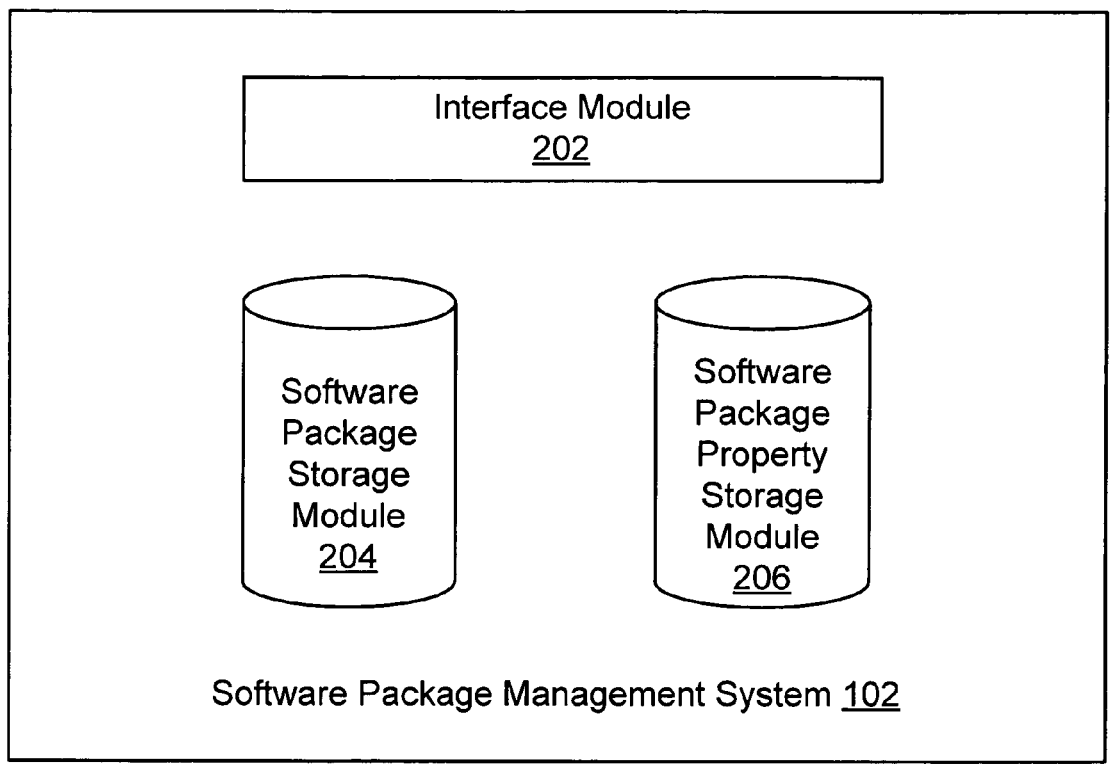
Figure 3:
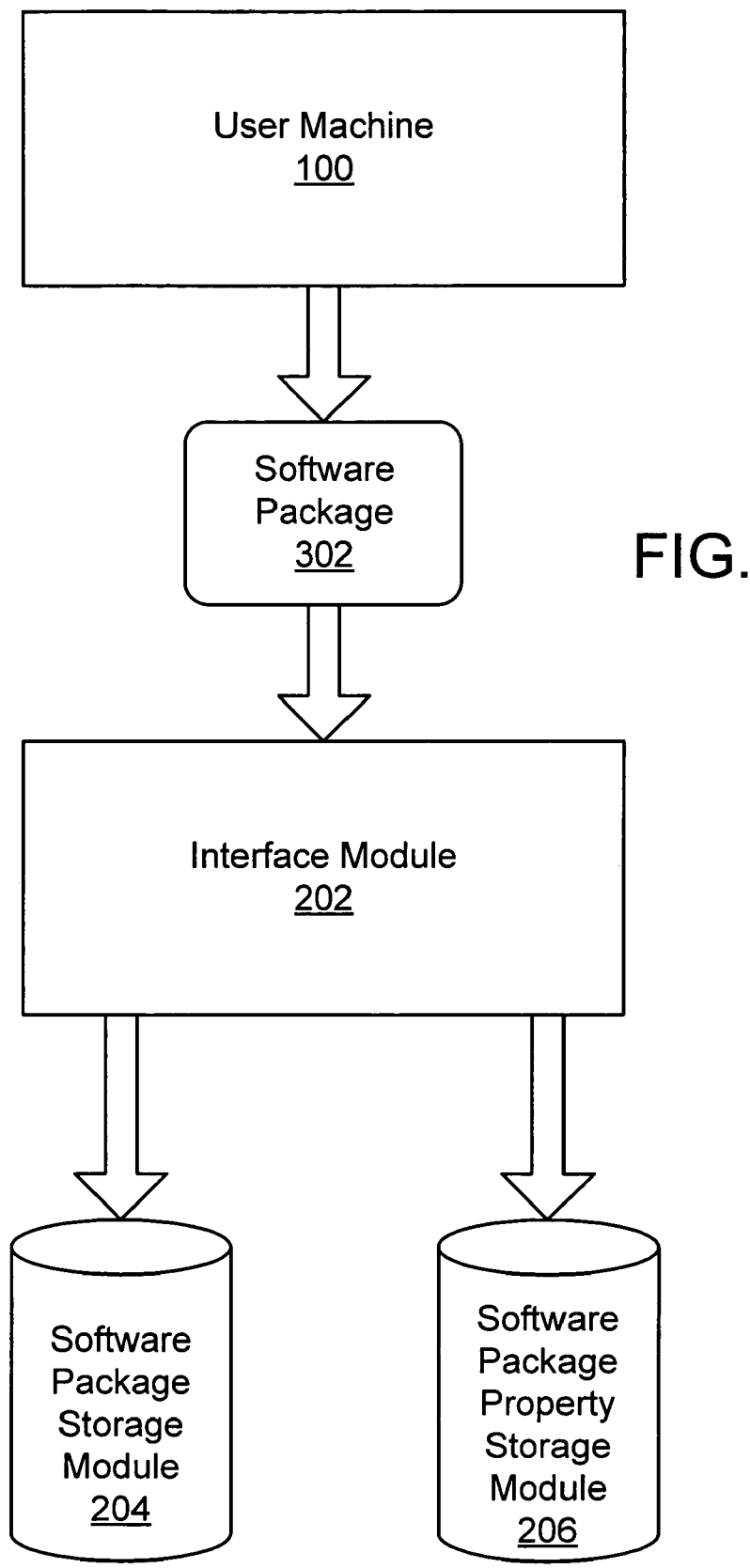

FIGS. 1-3 illustrate block diagrams of an exemplary software management system, according to embodiments of the present invention. In addition to software management systems, it is to be appreciated that other systems employing the various teachings herein may also be used to practice the various aspects of the present invention, and as such, are considered to be within its full scope.

In FIG. 1, a network diagram shows that one or more users 100 can use a software package management system 102 to manage and organize various software packages and their associated properties. In addition, the software package management system 102 provides a secure environment to store software packages that may be or have been distributed to one or more machines 104. A user 100 can use a distribution system 106 to distribute a software package stored in the software package management system 102 to one or more of the machines 104. A particular software package may originate internally within an enterprise or may be obtained externally, for example, from an independent software vendor or some other sources. In an embodiment, the machines 104 represent computer machines of a single enterprise.

Although not shown in FIG. 1, other components and/or systems may also be utilized in conjunction with an embodiment. For example, the users 100, software package management system 102, distribution system 106, and/or one or more of the machines 104 may be coupled to each other via a network. The network may be a local area network ("LAN"), wide area network ("WAN"), virtual private network ("VPN"), or other network that is configured to transmit data among the users 100, the software package management system 102, the distribution system 106, and/or one or more of the machines 104. In addition, a pre-deployment system (not shown) may allow a user 100 to test a software package on one or more machines 104 without installing the software package on the one or more machines 104. The pre-deployment system may be coupled between a machine 104 and the software package management system 102 (e.g., via a network).

FIG. 2 illustrates that the software package management system 102 includes an interface module 202, a software package storage module 204, and a software package property storage module 206. The interface module 202, the software package storage module 204, and the software package property storage module 206 may be software, firmware, and/or hardware modules or any combination of software, firmware, and/or hardware. One of ordinary skill in the art will appreciate that the various modules may be distributed differently than illustrated herein. The various modules may be combined into one or more modules and may be distributed among different computer machines. For example, the interface module 202 can be integrated with the software package storage module 204 and/or software package property storage module 206. Similarly, the software package storage module 204 can be integrated with the software package property storage module 206.

According to an embodiment, the interface module 202 serves as an interface between a user 100 and the software package storage module 204 and software package property storage module 206. The software package storage module 204 is configured to store software packages that may be or have been distributed to the machines 104. In an embodiment, the software package storage module 204 is secure such that the users 100 do not know the specific storage location of a software package and cannot directly access software packages stored in the software package storage module 204 without using the interface module 202. The software package property storage module 206 (e.g., a structured query language ("SQL") database) is configured to store various properties associated with a given software package stored in the software package storage module 204 and is accessible to the users 100 via the interface module 202.

In FIG. 3, a user 100 utilizes the interface 202 to import a software package into the software package management system 102. As shown, a user utilizing a user machine 100 provides a software package 302 to the interface module 202. According to an embodiment, the interface module 202 provides functionalities to manage storage of the software package 302 and its associated properties in the software package storage module 204 and software package property storage module 206, respectively. Specifically, in response to receiving the software package 302 from the user machine 100, the interface module 202 identifies various properties of the software package 302 (e.g., developer of the software package, program name, version, language, build number, release date, etc.). The interface module 202 stores these identified properties of the software package 302 in the software package property storage module 206. The interface module 202 is also configured to store the software package 302 itself to the software package storage module 204.

Figure 4A:
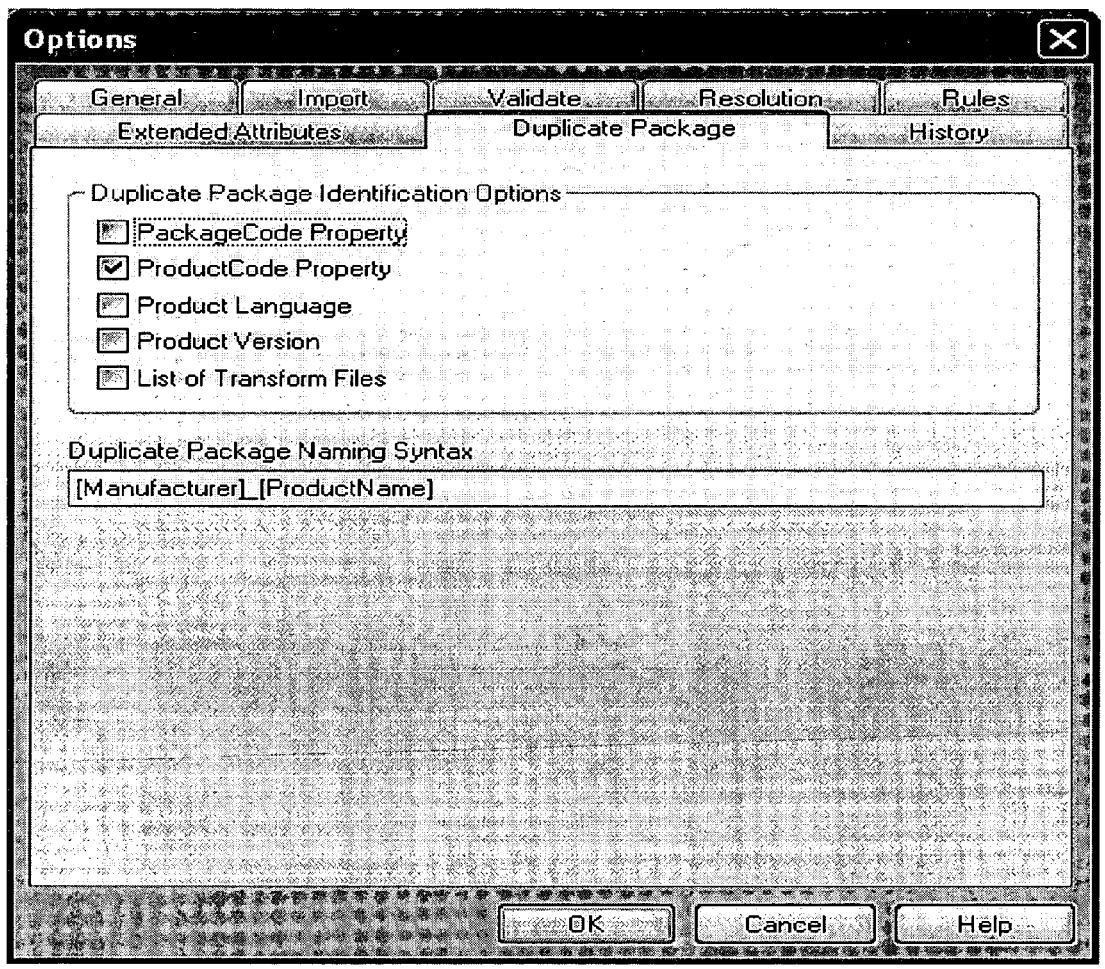
FIGS. 4A and 4B illustrate an exemplary screenshot of an interface module, according to an embodiment.

Thus, according to an embodiment, for software packages stored in the software package storage module 204, their associated properties are stored in the software package property storage module 206. A user 100 can utilize the interface module 202 to manage such software packages and their properties. For example, the interface module 202 is configured to compare properties of the software package 302 with software properties already existing in the software package property storage module 206, for example, to determine if the software package 302 is substantially similar to an existing package stored in the software package storage module 204 (e.g., both packages having the same or similar properties). In an embodiment, the user 100 can specify how the interface module 202 determines whether two software packages are substantially similar to each other. For example, FIG. 4A illustrates an exemplary screenshot of the interface module 202, according to an embodiment. As shown in FIG. 4A, the user 100 can specify that if two software packages have the same package code, product code, product language, product version, and/or list of transform files, then they are duplicative of each other or are otherwise substantially similar to each other.

Figure 4B:
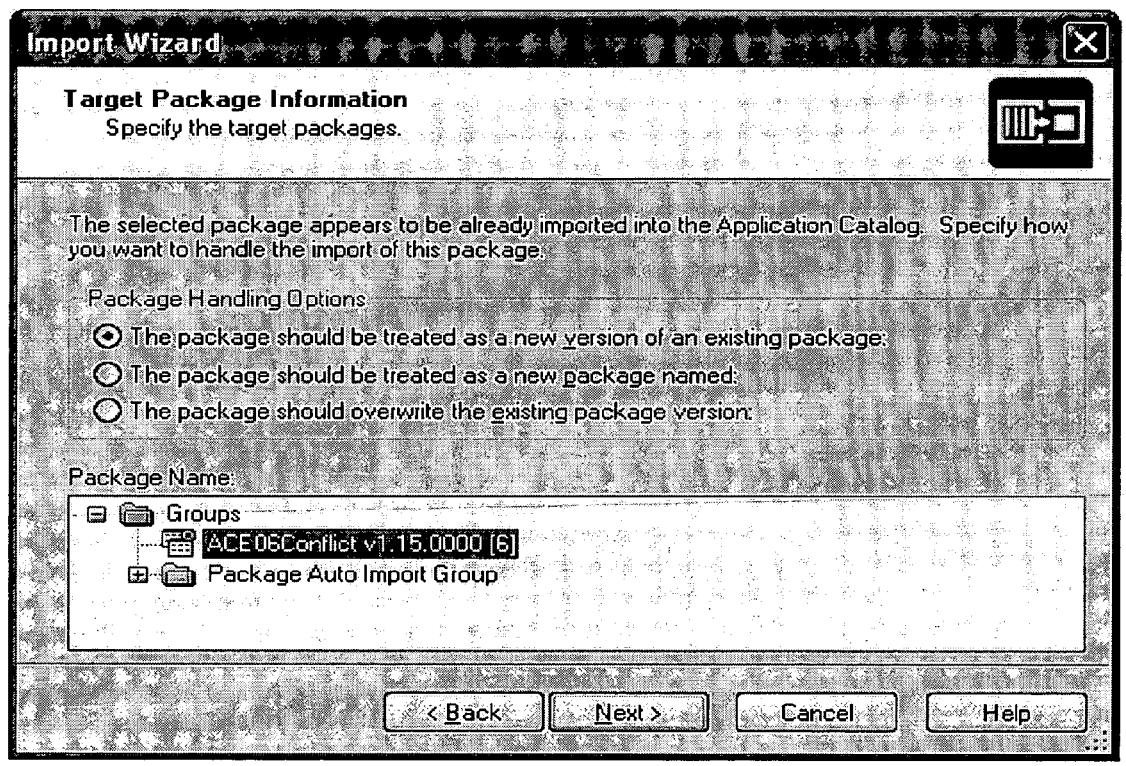

Thus, the interface module 202 is adapted to identify (and display) the relationships between the software package 302 and one or more other software packages stored in the software package storage module 204. The interface module 202 is also adapted to allow the user 100 to define the relationships between the software package 302 and one or more other software packages stored in the software package storage module 204 (e.g., if the interface module 202 determines that the software package 302 is substantially similar to a package existing in the software package storage module 204). For example, FIG. 4B illustrates another exemplary screenshot of the interface module 202, according to an embodiment. As shown in FIG. 4B, the user 100 may via the interface module 202 specify that the software package 302 is a new version of an existing package stored in the software package storage module 204. In this case, the software package 302 will become the new "active" version of the existing package stored in the software package storage module 204. The user 100 may also via the interface module 202 specify that the software package 302 is a new software package to be named and stored in the software package storage module 204 distinct from the existing package. The user 100 can specify a name for the software package 302 as well as a storage location (e.g., group hierarchy) of the software package 302 within the software package storage module 204. Alternatively, the interface module 202 is configured to automatically assign a name and storage location to the software package 302. Furthermore, the user 100 may via the interface module 202 specify that the software package 302 overwrites an existing version of a package existing in the software package storage module 204. In this case, the interface module 202 deletes the existing version of the package and replaces it with the software package 302 at a location where the existing version of package was found in the software package storage module 204.

In an embodiment, the user 100 can use the interface module 202 to manage software packages already stored in the software package storage module 204 by, for example, comparing and/or displaying properties of different packages, defining relationships between different packages, etc.

The interface module 202 allows the properties stored in the software package property storage module 206 to be displayed to the user and searchable by the user 100. Accordingly, the user 100 can identify a particular software package and manage, extract, or otherwise distribute the software package to one or more of the machines 104. For example, the interface module 202 can generate and provide a package report to the user 100. The package report identifies various properties of a given software package stored in the software package storage module 204.

In addition, the interface module 202 allows a user 100 to check out a copy of a software package stored in the software package storage module 204 by making a local copy of the package files on the user machine 100. In an embodiment, the interface module 202 assigns a unique identifier to a checked-out copy of the software package to provide a unique location for storage on the user machine 100. The interface module 202 also creates an entry in the software package storage module 204 to indicate the checked-out status of the software package. Using the same import process as described above, the user 100 can check in a local copy of a software package into the software package storage module 204 and properties of the software package into the software package property storage module 206. The interface module 202 further allows the user 100 to cancel a check-out by removing the local package files from the user machine 100 and deleting the checked-out status of a package in the software package storage module 204. In an embodiment, a user 100 having "administrator" privileges is able to cancel the check-outs previously executed by other users 100.

The software package property storage module 206 stores various properties of a software package stored in the software package storage module 204, including information on how to locate the software package within the software package storage module 204 (e.g., path information). Nevertheless, according to an embodiment, the path information stored in the software package property storage module 206 is not accessible to the user 100 (e.g., not displayed or provided to the user 100 via the interface module 202) such that the user 100 does not know the location of a software package within the software package storage module 204. In another embodiment, the software package property storage module 206 maintains package properties using a directory hierarchical structure such that relationships between different software packages are preserved even thought the software packages are stored in the software package storage module 204.

The software package storage module 204 provides a secure centralized storage for software package installations within an enterprise. Specifically, the software package storage module 204 stores the installation package files and securely manages access to these files. According to an embodiment, a user 100 does not know the path information of software packages stored within the software package storage module 204 (and thus cannot directly access and modify files stored within the software package storage module 204) but can access package properties stored in the software package property storage module 206 via the interface module 202. To prevent unintended modifications to files stored in the software package storage module 204, according to an embodiment, for those operations of the interface module 202 that can actually modify the files stored in the software package storage module 204, such operations would operate on working copies of the files.

A patch file (e.g., a Windows Installer Patch ("MSP") file) is a self-contained file that patches or updates an existing installed software package. A transform file (e.g., a Windows Installer Transform ("MST") file) is a file that can be applied independently during the installation of a software package to change a behavior of the installation. The interface module 202 is configured to import patch files or transform files to the software package storage module 204 by determining the relationships between these files and existing software packages within the software package storage module 204 and allowing a user 100 to add these files to a specific software package within the software package storage module 204. For example, the interface module 202 is configured to identify the proper location within the software package storage module 204 to store the patch and/or transform files, locate specific external files associated with the patch and/or transform files and import them to the software package storage module 204, copying the patch and/or transform files into the software package storage module 204, and copying the properties associated with the patch and/or transform files (e.g., directory structure, developer, name, version, language, build number, release date, etc.) into the software package property storage module 206. Other files that may be imported into the software package storage module 204 (and their associated properties into the software package property storage module 206, include, but are not limited to, executable files, operating system snapshot, extensible markup language ("XML") files, Windows installer file ("MSI") files, Marimba native channel packager ("NCP") files, and merge module ("MSM") files.

Figure 5:
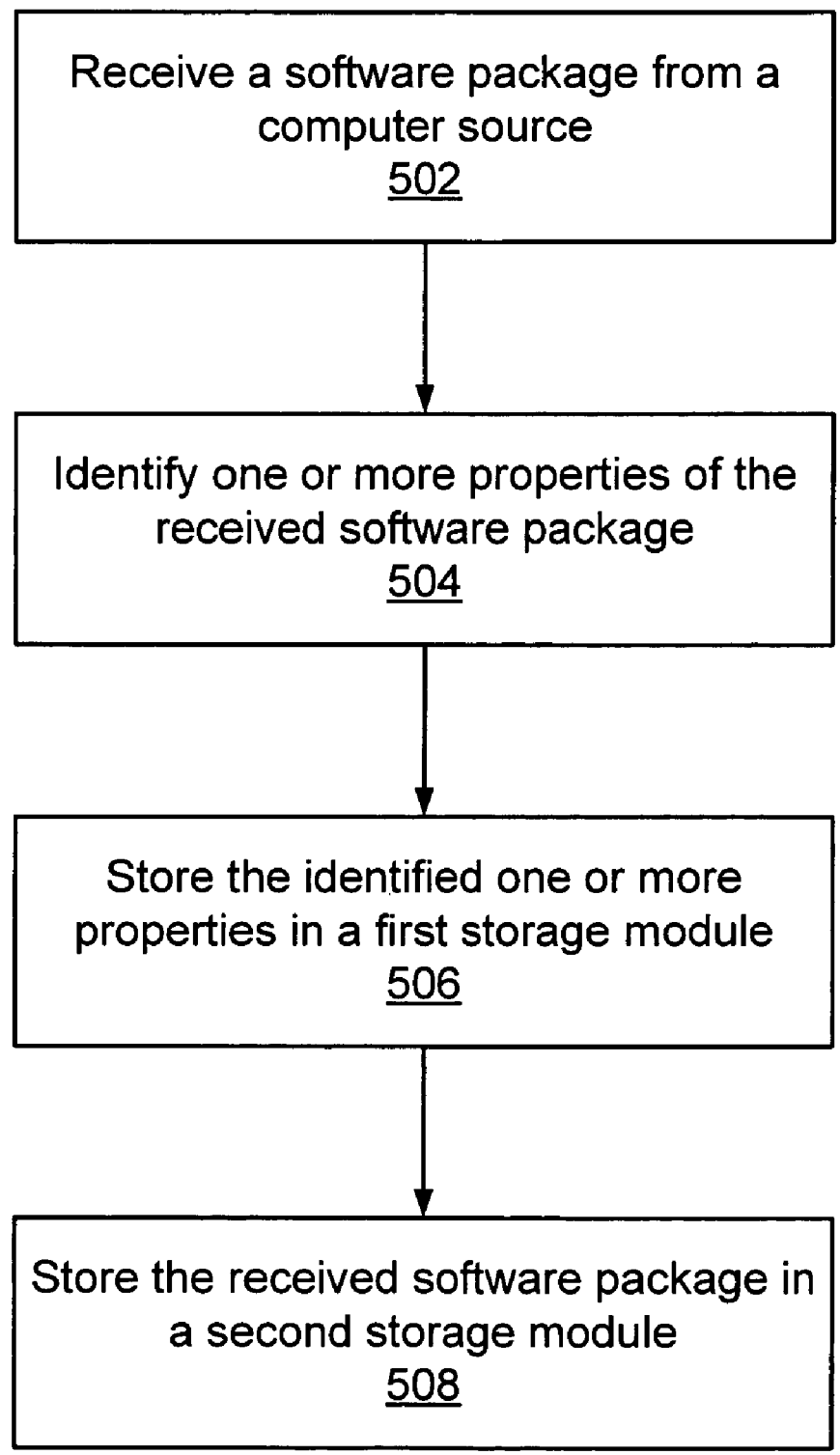
FIG. 5 illustrates a flow diagram of an exemplary process of managing and organizing software package installations, according to an embodiment.

FIG. 5 illustrates a flow diagram of an exemplary process of managing and organizing software package installations, according to an embodiment. In FIG. 5, an interface module 202 receives a software package 302 from a computer source. (502) The interface module 202 identifies one or more properties of the software package 302. (504) The interface module 202 stores the identified one or more properties of the software package 302 in a first storage module such as the software package property storage module 206. (506) The interface module 202 stores the software package 302 in a second storage module such as the software package storage module 204 (508). Based on the identified properties of the software package 302, the interface module 202 identifies a relationship between the software package 302 and another software package stored in the second storage module. For example, the interface module 202 may determine that the software package 302 is substantially similar to the other software package according to a property of the software package 302. The interface module 202 can also specify the software package 302 as a new version of the other software package or replace the other software package in the second storage module with the software package 302. In an embodiment, the location of the software package 302 within the second storage module is not accessible to the user 100.

Figure 6:
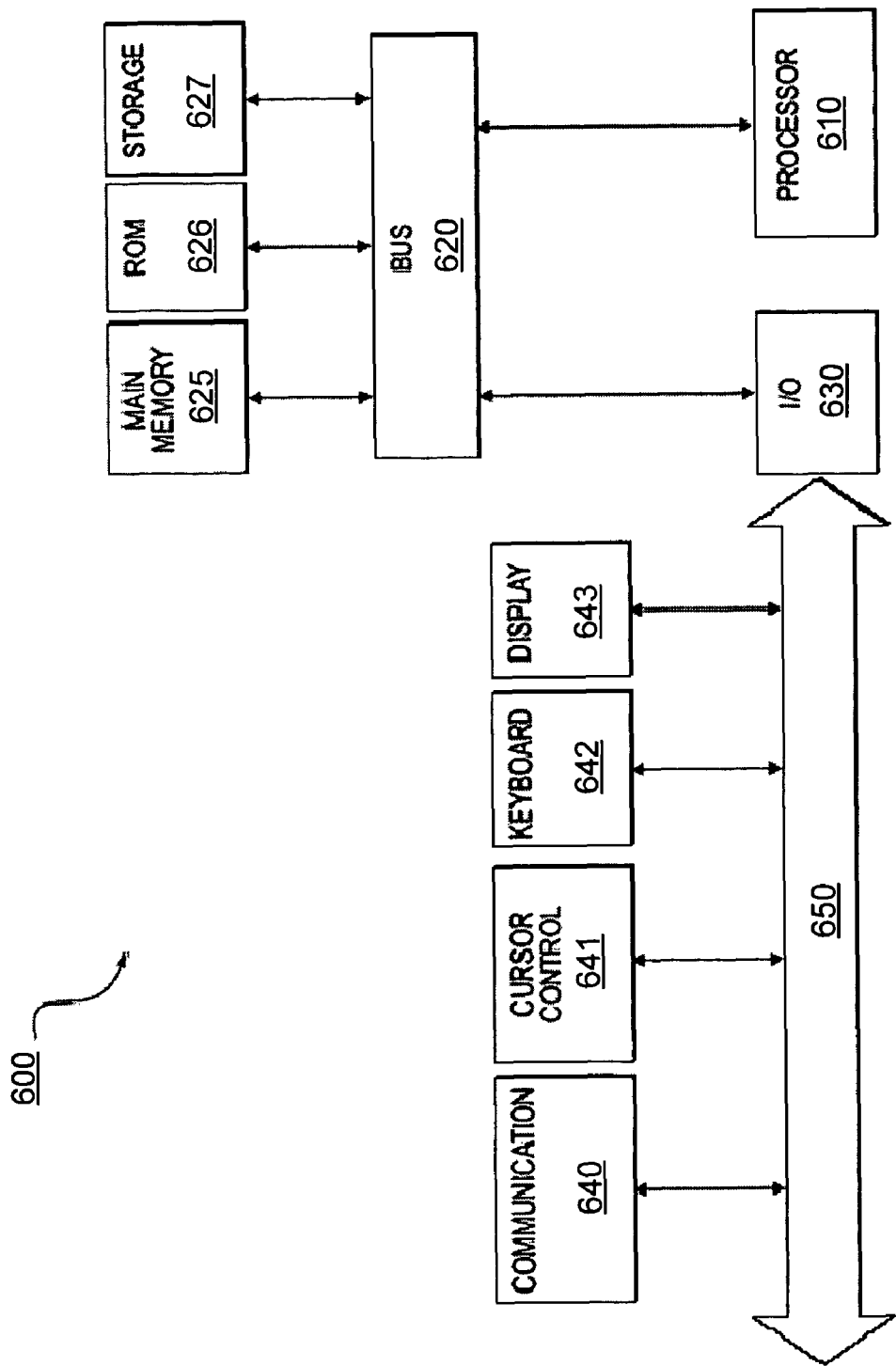
FIG. 6 illustrates an exemplary computer architecture for use with the present system, according to one embodiment.

FIG. 6 illustrates an exemplary computer architecture for use with the present system, according to one embodiment. Computer architecture 600 can be used to implement the user machines 100, the machines 104, the distribution system 106, and/or the software package management system 102 (including any of the interface module 202, the software package storage module 204, and the software package property storage module 206). One embodiment of architecture 600 comprises a system bus 620 for communicating information, and a processor 610 coupled to bus 620 for processing information. Architecture 600 further comprises a random access memory (RAM) or other dynamic storage device 625 (referred to herein as main memory), coupled to bus 620 for storing information and instructions to be executed by processor 610. Main memory 625 also may be used for storing temporary variables or other intermediate information during execution of instructions by processor 610. Architecture 600 also may include a read only memory (ROM) and/or other static storage device 626 coupled to bus 620 for storing static information and instructions used by processor 610.

A data storage device 627 such as a magnetic disk or optical disc and its corresponding drive may also be coupled to computer system 600 for storing information and instructions. Architecture 600 can also be coupled to a second I/O bus 650 via an I/O interface 630. A plurality of I/O devices may be coupled to I/O bus 650, including a display device 643, an input device (e.g., an alphanumeric input device 642 and/or a cursor control device 641). For example, web pages and business related information may be presented to the user on the display device 643.

The communication device 640 is for accessing other computers (servers or clients) via a network. The communication device 640 may comprise a modem, a network interface card, a wireless network interface or other well known interface device, such as those used for coupling to Ethernet, token ring, or other types of networks.

Although the present method and system have been described in connection with a software distribution system, one of ordinary skill would understand that the techniques described may be used in any situation where it is to effectively manage and organize various software.

A method and system for managing and organizing software package installations have been disclosed. Although the present methods and systems have been described with respect to specific examples and subsystems, it will be apparent to those of ordinary skill in the art that it is not limited to these specific examples or subsystems but extends to other embodiments as well.

We claim:

1. A computer-implemented method, comprising:
receiving a software package from a computer source;
identifying one or more properties of the received software package;
storing the identified one or more properties in a first storage module, wherein the identified one or more properties are displayed to a user in an interface; and storing the received software package in a second storage module;

selecting by the user in the interface from the identified one or more properties to identifying a relationship between the received software package and an existing software package stored in the second storage module, wherein identifying the relationship comprises determining if the received software package is substantially similar to the existing software package stored in the second storage module as a function of a property of the received software package; and allowing the user in the interface to define the relationship between the received software package and the existing software package stored in the second storage module in response to receiving the software package from the computer source, wherein allowing the user in the interface to define the relationship comprises allowing the user to specify that the received software package is a new version of the existing software package stored in the second storage module, that the received software package overwrites the existing software package stored in the second storage module, or that the received software package is a new package distinct from the existing software package stored in the second storage module.

2. The computer-implemented method of claim 1, further comprising:

specifying the received software package as a new version of the existing software package stored in the second storage module.

3. The computer-implemented method of claim 1, further comprising:

replacing the existing software package stored in the second storage module with the received software package.

4. The computer-implemented method of claim 1, wherein a location of the existing software package within the second storage module is not accessible to a user.

5. The computer-implemented method of claim 1, further comprising:

allowing the user to specify if the received software package is substantially similar to the existing software package stored in the second storage module as a function of one or more properties of the received software package.

6. A non-transitory computer-readable medium having stored thereon a plurality of instructions, said plurality of instructions when executed by a computer, cause said computer to perform:

receiving a software package from a computer source;

identifying one or more properties of the received software package;

storing the identified one or more properties in a first storage module, wherein the identified one or more properties are displayed to a user in an interface;

storing the received software package in a second storage module;

selecting by the user in the interface from the identified one or more properties to identifying a relationship between the received software package and an existing software package stored in the second storage module, wherein the identifying the relationship between the received software package and the existing software package stored in the second storage module comprises determining if the received software package is substantially similar to the existing software package stored in the second storage module as a function of a property of the received software package; and allowing the user in the interface to define the relationship between the received software package and the existing software package stored in the second storage module in response to receiving the software package from the computer source, wherein allowing the user in the interface to define the relationship comprises allowing the user to specify that the received software package is a new version of the existing software package stored in the second storage module, that the received software package overwrites the existing software package stored in the second storage module, or that the received software package is a new package distinct from the existing software package stored in the second storage module.

7. The non-transitory computer-readable medium of claim 6, wherein the plurality of instructions cause the computer to perform:

specifying the received software package as a new version of the existing software package stored in the second storage module.

8. The non-transitory computer-readable medium of claim 6, wherein the plurality of instructions cause the computer to perform:

replacing the existing software package stored in the second storage module with the received software package.

9. The non-transitory computer-readable medium of claim 6, wherein a location of the existing software package within the second storage module is not accessible to a user.

10. The non-transitory computer-readable medium of claim 6, wherein the plurality of instructions cause the computer to perform:

allowing the user to specify if the received software package is substantially similar to the existing software package stored in the second storage module as a function of one or more properties of the received software package.

11. A computer system, comprising:

a processor; and memory coupled to the processor, the memory storing instructions;

wherein the instructions when executed by the processor cause the processor to, receive a software package from a computer source;

identify one or more properties of the received software package;

store the identified one or more properties in a first storage module, wherein the identified one or more properties are displayed to a user in an interface; and store the received software package in a second storage module;

select by the user in the interface from the identified one or more properties to identify a relationship between the received software package and an existing software package stored in the second storage module, wherein the identifying the relationship between the received software package and the existing software package stored in the second storage module comprises determining if the received software package is substantially similar to the other software package as a function of a property of the received software package; and allow the user in the interface to define the relationship between the received software package and the existing software package stored in the second storage module in response to receiving the software package from the computer source, wherein the allowing the user in the interface to define the relationship comprise allowing the user to specify that the received software package is a new version of the existing software package stored in the second storage module, that the received software package overwrites the existing software package stored in the second storage module, or that the received software package is a new package distinct from the existing software package stored in the second storage module.

12. The computer system of claim 11, wherein the instructions cause the processor to:

specify the received software package as a new version of the existing software package stored in the second storage module.

13. The computer system of claim 11, wherein the instructions cause the processor to:

replace the existing software package stored in the second storage module with the received software package.

14. The computer system of claim 11, wherein a location of the exist software package within the second storage module is not accessible to a user.

15. The computer system of claim 11, wherein the instructions cause the processor to:

allow the user to specify if the received software package is substantially similar to the existing software package stored in the second storage module as a function of one or more properties of the received software package.

* * * * *